(12) United States Patent
Rice

(10) Patent No.: US 9,022,306 B2
(45) Date of Patent: May 5, 2015

(54) RECYCLING SYSTEMS AND METHODS FOR PLASTIC WASTE

(71) Applicant: David D. B. Rice, Montrose, WV (US)

(72) Inventor: David D. B. Rice, Montrose, WV (US)

( * ) Notice: Subject to any disclaimer, the term of this patent is extended or adjusted under 35 U.S.C. 154(b) by 134 days.

(21) Appl. No.: 13/792,054

(22) Filed: Mar. 9, 2013

(65) Prior Publication Data

US 2014/0252142 A1    Sep. 11, 2014

(51) Int. Cl.
| | | |
|---|---|---|
| *B02C 13/00* | (2006.01) | |
| *B29B 7/16* | (2006.01) | |
| *B01F 7/00* | (2006.01) | |
| *B02C 13/06* | (2006.01) | |
| *B02C 13/28* | (2006.01) | |
| *B29B 17/00* | (2006.01) | |
| *B29B 7/28* | (2006.01) | |

(52) U.S. Cl.
CPC . *B29B 7/16* (2013.01); *B01F 7/001* (2013.01); *B02C 13/06* (2013.01); *B02C 13/2804* (2013.01); *B29B 17/0026* (2013.01); *B29B 7/286* (2013.01); *B29B 2017/0089* (2013.01)

(58) Field of Classification Search
CPC ............................ B02C 13/2804; B02C 13/06
USPC ............................. 241/195, 192, 189.1, 285.2
See application file for complete search history.

(56) References Cited

U.S. PATENT DOCUMENTS

| | | | |
|---|---|---|---|
| 1,424,445 A | 8/1922 | Bowen et al. | |
| 3,591,146 A | 7/1971 | Sutter | |
| 3,652,062 A | 3/1972 | Baker | |
| 3,776,529 A | 12/1973 | Sutter et al. | |
| 3,778,036 A | 12/1973 | Collin | |
| 4,013,616 A | 3/1977 | Wallace | |
| 4,123,584 A | 10/1978 | Brewton | |
| 4,789,597 A | 12/1988 | Gupta et al. | |
| 4,808,665 A | 2/1989 | Patel et al. | |
| 4,946,109 A * | 8/1990 | Lewis | 241/189.1 |
| 5,141,168 A | 8/1992 | Pepper | |
| 5,221,054 A * | 6/1993 | Bergmann et al. | 241/192 |

(Continued)

FOREIGN PATENT DOCUMENTS

| | | |
|---|---|---|
| CN | 102059065 | 5/2011 |
| RU | 2287361 | 11/2006 |
| SU | 1694194 | 11/1991 |

OTHER PUBLICATIONS

ISA, "ISR PCT/US 2014/017718," May 15, 2014, 6 pages.

(Continued)

*Primary Examiner* — Faye Francis
(74) *Attorney, Agent, or Firm* — Michael R. Schacht; Schacht Law Office, Inc.

(57) ABSTRACT

The present invention may be embodied as a compounding system having a chamber assembly defining a working chamber; a shaft, a sleeve assembly, and a plurality of arms. The sleeve assembly has first and second sleeve members each defining at least one arm opening and adapted to be arranged in a first configuration in which the first and second sleeve members are detached from each other and a second configuration in which the first and second sleeve members are secured together around the shaft to support the sleeve assembly on the shaft. Each of the arms is configured to be inserted partly through one of the arm openings when the sleeve assembly is in the first configuration and held in a desired configuration relative to one of the first and second sleeve members when the sleeve assembly is in the second configuration.

10 Claims, 14 Drawing Sheets

(56) References Cited

U.S. PATENT DOCUMENTS

| | | |
|---|---|---|
| 5,300,267 A | 4/1994 | Moore |
| 5,433,388 A | 7/1995 | Hirz et al. |
| 5,511,729 A | 4/1996 | Husain |
| 5,598,981 A * | 2/1997 | Hellmich .................. 241/189.1 |
| 5,887,808 A * | 3/1999 | Lucas ............................ 241/82 |
| 5,891,955 A | 4/1999 | Mariani et al. |
| 5,895,790 A | 4/1999 | Good |
| 6,022,137 A | 2/2000 | White et al. |
| 6,092,752 A * | 7/2000 | Heukamp et al. .......... 241/189.1 |
| 6,107,400 A | 8/2000 | Mariani et al. |
| 6,709,146 B1 | 3/2004 | Little et al. |
| 8,118,476 B2 | 2/2012 | Kasahara et al. |
| 2007/0263480 A1 | 11/2007 | Saalmann et al. |
| 2008/0019212 A1 | 1/2008 | Dietz et al. |

OTHER PUBLICATIONS

Drais/Draiswerke Gelimat System for Utrahigh-Speed Thermokinetic Mixing, Compounding Brochure, 1998, 4 pages.

Fluxing Drais News, 1998, 8 pages, vol. 1, No. 4.

USPTO, U.S. Appl. No. 13/564,097, Jan. 2, 2015, 20 pages.

* cited by examiner

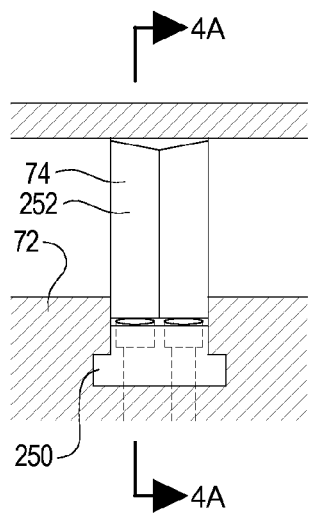
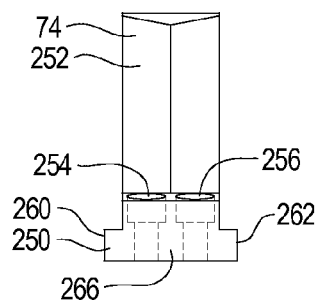
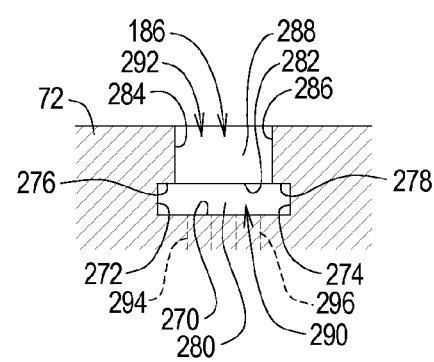
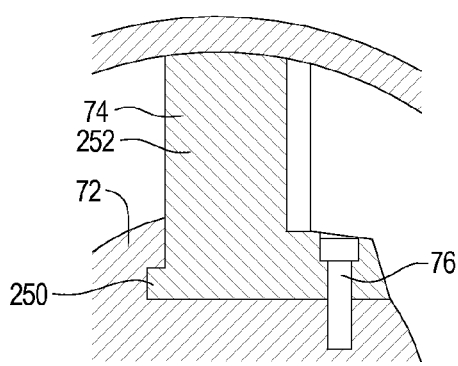
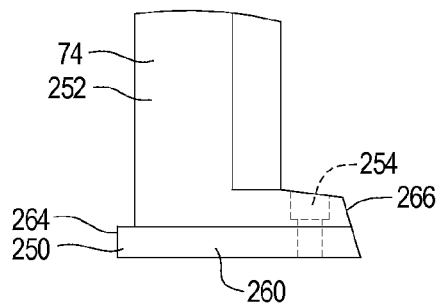
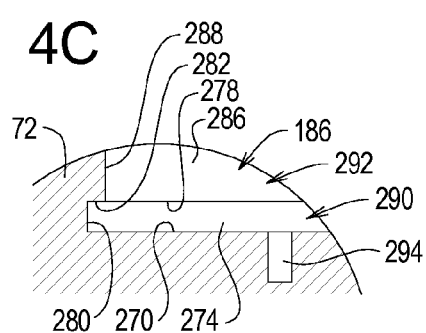

RECYCLING SYSTEMS AND METHODS FOR PLASTIC WASTE

TECHNICAL FIELD

The present application relates to systems and methods for recycling plastic materials and, more specifically, to plastic processing systems for processing recycled plastic materials of undetermined composition.

BACKGROUND

Much of the plastic waste generated is potentially recyclable. However, plastic waste of different compositions cannot easily be processed together into reusable plastic stock material. The sorting of plastic waste into a classes that can be processed together for reuse is not easily accomplished. Further, certain waste plastic is contaminated, and it may not be practical or even possible to process contaminated waste plastic. Accordingly, once waste plastic is introduced in the waste stream, the recycling of waste plastic is generally not practical.

U.S. Pat. No. 6,709,146 discloses a system and method for processing plastic waste of unknown origin into reusable plastic material. The '146 patent discloses the use of a mixer to process plastic waste such that waste is converted into a stock material that can be molded to form useable plastic parts. The system and method disclosed in the '146 is susceptible to breakage and is difficult to clean, maintain, and repair.

The need thus exists for systems and methods for processing plastic waste of unknown origin into reusable plastic material that are more reliable and can more easily be cleaned, maintained, and repaired.

SUMMARY

The present invention may be embodied as a compounding system for feed material containing plastic waste. The compounding system comprises a chamber assembly defining a working chamber; a shaft, a sleeve assembly, and a plurality of arms. The sleeve assembly comprises first and second sleeve members each defining at least one arm opening. The first and second sleeve members are adapted to be arranged in a first configuration in which the first and second sleeve members are detached from each other and a second configuration in which the first and second sleeve members are secured together around the shaft to support the sleeve assembly on the shaft. Each of the arms is configured to be inserted partly through one of the arm openings when the sleeve assembly is in the first configuration and held in a desired configuration relative to one of the first and second sleeve members when the sleeve assembly is in the second configuration. Feed material is processed by rotating the sleeve assembly such that the arms engage the feed material.

The present invention may also be embodied as a recycling system for feed material containing plastic waste. The recycling system comprises a chamber assembly defining a working chamber, a shaft, first and second bearing systems for supporting the shaft for axial rotation, a sleeve assembly, and a plurality of arms. The sleeve assembly comprises first and second sleeve members each defining at least one arm opening, where the first and second sleeve members are adapted to be arranged in a first configuration in which the first and second sleeve members are detached from each other and a second configuration in which the first and second sleeve members are secured together around the shaft to support the sleeve assembly on the shaft. Each of the arms is configured to be inserted partly through one of the arm openings when the sleeve assembly is in the first configuration and held in a desired configuration relative to one of the first and second sleeve members when the sleeve assembly is in the second configuration. Feed material is processed by rotating the sleeve assembly such that the arms engage the feed material.

The present invention may be embodied as a method of compounding feed material containing plastic waste comprising the following steps. A chamber assembly defining a working chamber is provided. First and second sleeve members each defining at least one arm opening are provided. A plurality of arms is provided. The arms are inserted partly through one of the arm openings. The first and second arms are secured together around the shaft to support the sleeve assembly on the shaft. The sleeve assembly is rotated such that the arms engage the feed material to process the feed material.

BRIEF DESCRIPTION OF THE DRAWINGS

FIG. 3A is a somewhat schematic section view of portions of an example sleeve and example arms taken along lines 3A-3A in FIG. 2;

FIG. 3B is similar to FIG. 3A but shows a portion of only the example arm;

FIG. 3C is similar to FIG. 3A but shows a portion of only the example sleeve;

FIG. 4A is a section view of portions of the example sleeve and example arms taken along lines 4A-4A in FIG. 3A;

FIG. 4B is similar to FIG. 4A but shows a portion of only the example arm;

FIG. 4C is similar to FIG. 4A but shows a portion of only the example sleeve;

DETAILED DESCRIPTION

Figure 1:
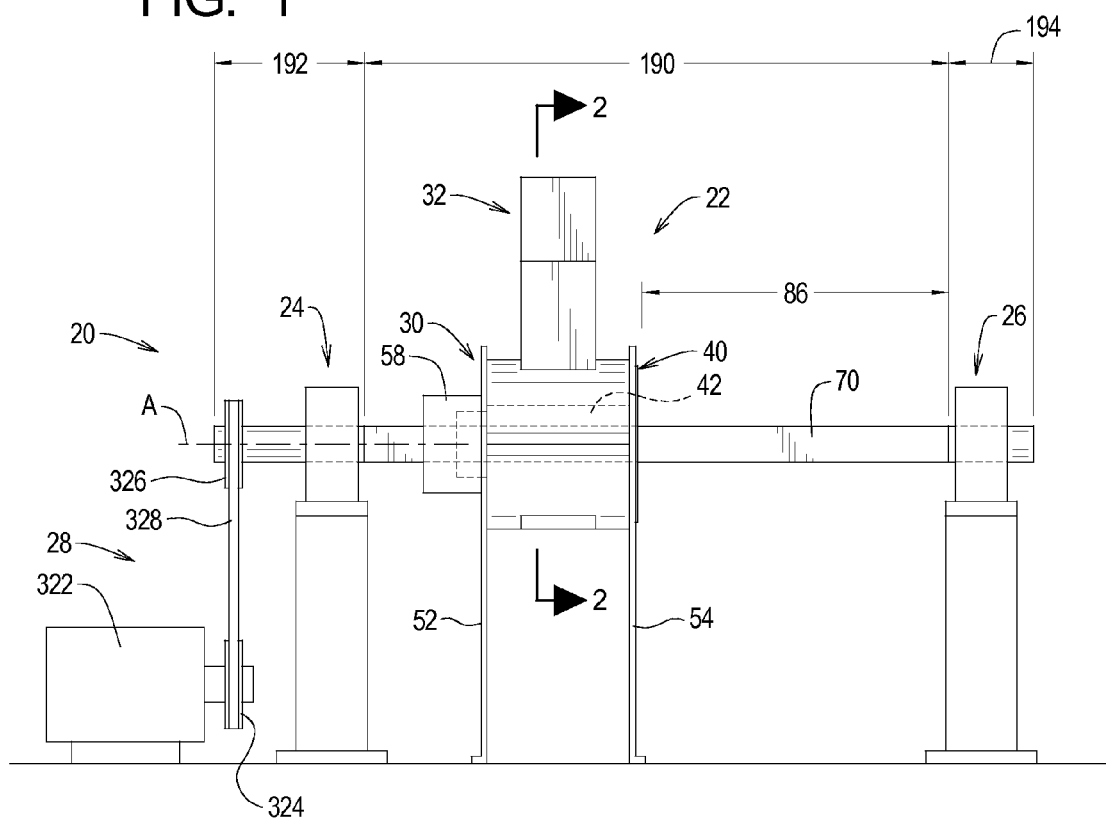
FIG. 1 is a somewhat schematic, side elevation view of an example recycling system of the present invention.

Referring initially to FIG. 1 of the drawing, depicted therein is an first example recycling system 20 constructed in accordance with, and embodying, the principles of the present invention. The first example recycling system 20 comprises a processing system 22, first and second bearing systems 24 and 26, and a drive system 28.

Figure 2:
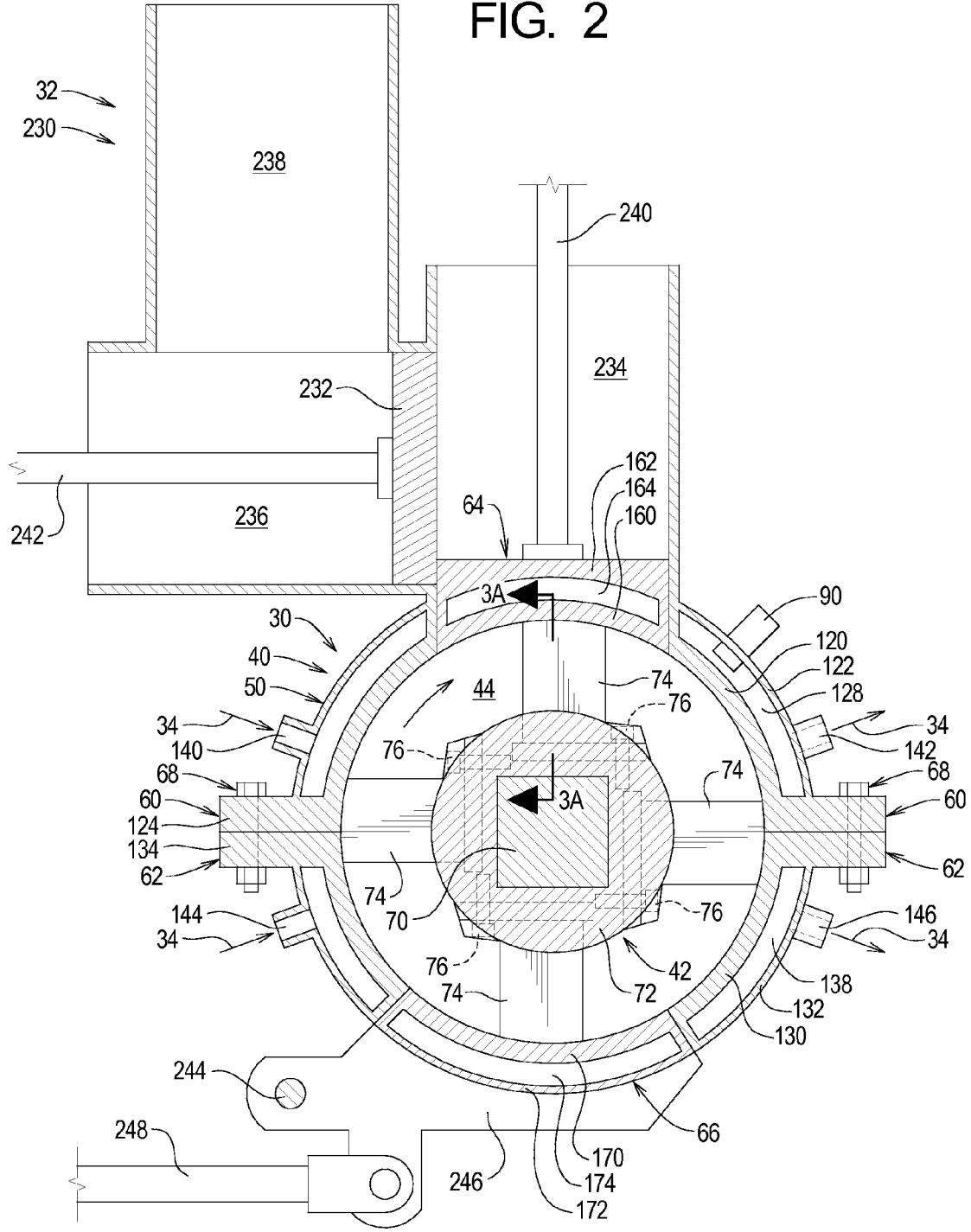
FIG. 2 is a section view taken along lines 2-2 in FIG. 1.

As perhaps best shown in FIG. 2, the example processing system 22 comprises a compounding system 30, a feed system 32, and a cooling system 34. The example compounding system 30 comprises a chamber assembly 40 and a compounding assembly 42. The example chamber assembly 40 defines a working chamber 44, and at least a portion of the compounding assembly 42 is arranged within the working chamber 44.

The example chamber assembly 40 comprises a housing assembly 50, a first end plate 52, a second end plate 54, a seal ring 56, and a locking hub 58. The housing assembly 50 comprises a housing upper structure 60, a housing lower structure 62, a feed door 64, a dump door 66, and a plurality of housing bolt assemblies 68. The housing bolt assemblies 68 join the housing upper structure 60 and the housing lower structure 62 together. The example compounding assembly 42 comprises a shaft 70, a sleeve 72, a plurality of arms 74, a plurality of arm bolts 76, and a plurality of hub bolts 78.

The arms 74 are supported by the sleeve such that the arms radially extend from the sleeve 72. The sleeve 72 is supported by the shaft 70 for movement along the shaft 70 and such that axial rotation of the shaft 70 causes circular rotation of the arms 74 about a working path. The shaft 70 is supported by the bearing systems 24 and 26 for axial rotation.

The housing assembly 50 defines a feed opening 80, a dump opening 82, and a service opening 84. The first example recycling system 20 defines a service area 86 as will be described in further detail below. In the example processing system 22, a temperature sensor 90 is mounted on the housing assembly 50 as shown in FIG. 2.

Figure 12:
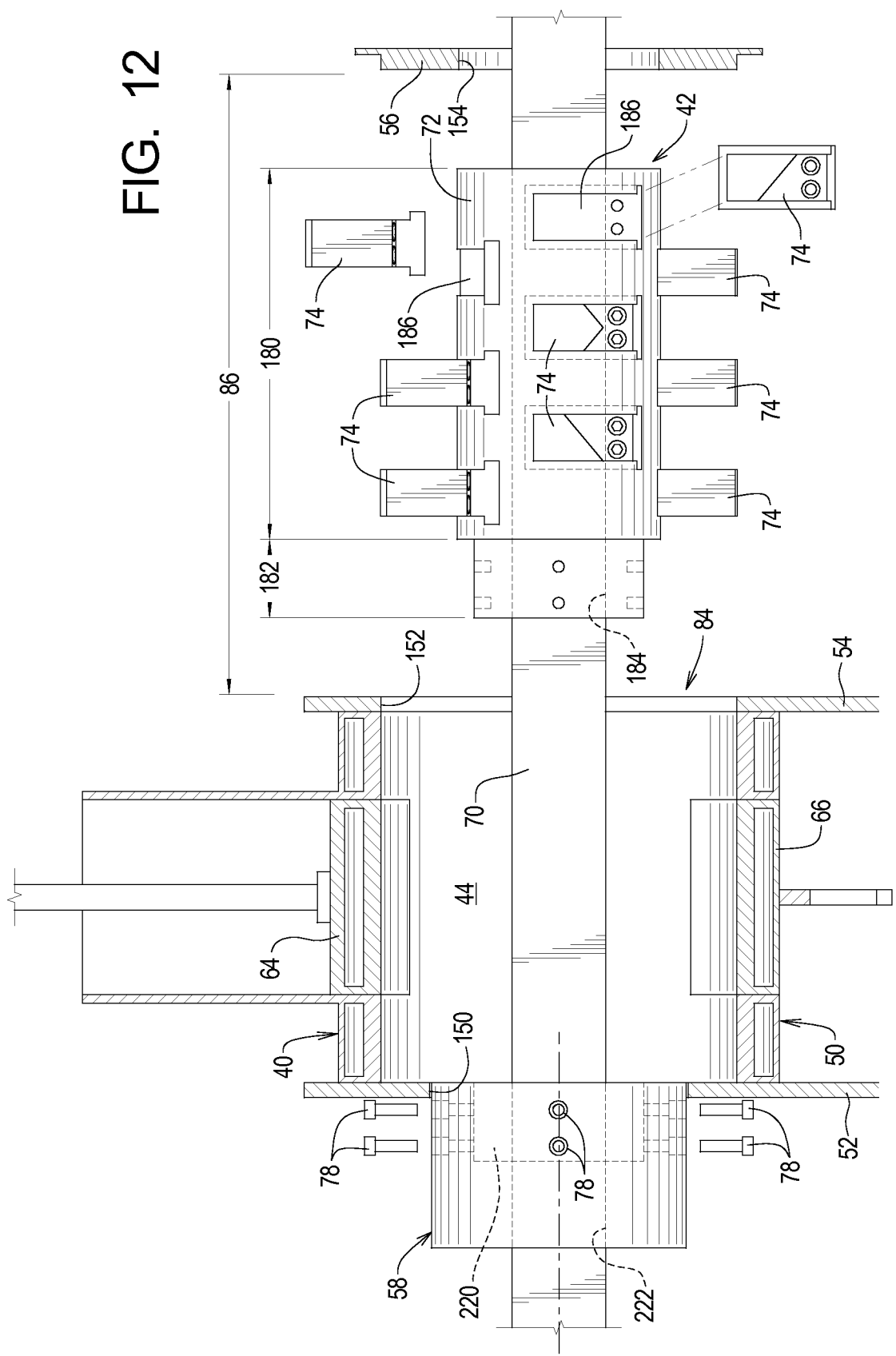
FIG. 12 is a partial section view of the compounder in a maintenance configuration.

The sleeve 72 is supported by the shaft 70 so that the locking hub 58 fixes the sleeve 72 in an operating position as depicted in FIG. 1. The sleeve 72 is within the working chamber 44 defined by the chamber assembly 40 when in the operating position. By disconnecting the sleeve 72 from the locking hub 58, the sleeve 72 may be moved along the shaft 70 outside of the working chamber 44 and into a maintenance position along the shaft 70 as depicted in FIG. 12. In the maintenance position, the sleeve 72 is within the service area 86. The example first and second bearing systems 24 and 26 support the shaft 70 for rotation about a shaft axis A and are spaced from each other to allow the sleeve 72 on opposite sides of the operating and maintenance positions.

With the recycling system 20 in an operating mode, the sleeve 72 is fixed in the operating position and is thus located within the working chamber 44. The dump door 66 is closed, and the feed system 32 arranges feed material containing plastic waste within the working chamber 44. The feed door 64 is closed after the feed material has been arranged in the working chamber 44. The drive system 28 is operatively connected to the shaft 70 such that operation of the drive system 28 causes axial rotation of the shaft 70 about the shaft axis A. Axial rotation of the shaft 70 causes rotation of the arms 74 along a circular path within the working chamber 44. The arms 74 act on the feed material to grind, blend, mix, heat, and/or otherwise process the feed material to obtain, after a processing period, processed material. After the processing period, the processed material is dough-like and warm and can be further molded into a plastic part. Based on a temperature detected by the temperature sensor 90, the cooling system 34 may be used as necessary to remove heat from the housing assembly 50 and thus reduce an operating temperature of the compounding system 30 as necessary.

To place the recycling system 20 in a maintenance mode, the sleeve 72 is detached from the shaft 70 and moved from operating position to the maintenance position. With the sleeve 72 in the maintenance position, the arms 74 may easily be repaired or removed and replaced. In addition, the working chamber 44 may easily be accessed for cleaning, maintenance, and repair with the sleeve 72 in the maintenance position. The feed and dump doors 64 and 66 may further be opened to facilitate access to the working chamber.

With the foregoing understanding of the first example recycling system 20, the details of this first example recycling system 20, and in particular the compounding system 30 thereof, will now be described in further detail.

The example housing upper structure 60 comprises an upper inner wall 120, an upper outer wall 122, a first upper flange 124, and a second upper flange 126. The upper inner and upper outer walls 120 and 122 are connected to define an upper cooling chamber 128. The example housing lower structure 62 comprises a lower inner wall 130, a lower outer wall 132, a first lower flange 134, and a second lower flange 136. The lower inner and lower outer walls 130 and 132 are connected to define a lower cooling chamber 138. The housing bolt assemblies 68 extend through the flanges 124 and 134 and through the flanges 126 and 136 to join the housing structures 60 and 62 together to form the housing assembly 50.

An upper inlet port 140 and upper outlet port 142 are formed in the upper outer wall 122. Fluid introduced into the upper inlet port 140 flows through the upper cooling chamber 128 and out of the upper outlet port 142. Similarly, a lower inlet port 144 and lower outlet port 146 are formed in the lower outer wall 132. Fluid introduced into the lower inlet port 144 flows through the lower cooling chamber 138 and out of the lower outlet port 146. The optional cooling system 34 is not shown in detail but may be implemented using a pump or compressor and a working fluid appropriate for removing heat from the housing assembly 50 to maintain the operating temperature of the compounding system 30 within a predetermined range.

As perhaps best shown in FIG. 12, the first end plate 52 defines a hub opening 150, and the second end plate 54 defines an access opening 152. The access opening 152 is sized and dimensioned to allow the shaft 70 to extend out of the interior of the working chamber 44.

FIG. 12 also shows that the seal ring 56 defines a seal ring opening 154. The seal ring 56 is sized and dimensioned to be secured to the end plate 54 when the recycling system 20 is in the operating mode to prevent feed material from exiting the working chamber 44 through the access opening 152.

The example feed door 64 comprises a feed door inner wall 160 and a feed door outer wall 162 that are connected to define a feed door cooling chamber 164. The example dump door 66 comprises a dump door inner wall 170 and a dump door outer wall 172 that are connected to define a dump door cooling chamber 174. Appropriate inlet and outlet ports like the ports 140-146 discussed above may be formed in the feed door outer wall 162 and/or dump door outer wall 172 to allow cooling fluid to be introduced into the feed door chamber 164 and/or dump door chamber 174.

Referring again to FIG. 12, it can be seen that the example sleeve 72 comprises a main portion 180 and a hub portion 182. A collar shaft opening 184 extends through the sleeve 72 along a longitudinal axis thereof. The example main portion 180 is generally cylindrical but defines a plurality of arm cavities 186 as will be described in further detail below. A cross-sectional area of the example hub portion 182 is less than that of the main portion 180 as indicated in FIG. 12.

FIG. 1 shows that the example shaft 70 comprises a central portion 190 and first and second end portions 192 and 194. The example central portion 190 is square in cross-section, while the end portions 192 and 194 are substantially cylindrical in cross-section. A cross-section of the collar shaft opening 184 substantially matches, but is slightly larger than, the cross-sectional shape of the central portion 190 of the example shaft 70. A cross-section of the seal ring opening 154 substantially matches the cross-sectional shape of a portion of the sleeve 72 adjacent to the seal ring opening 154.

Figure 5:
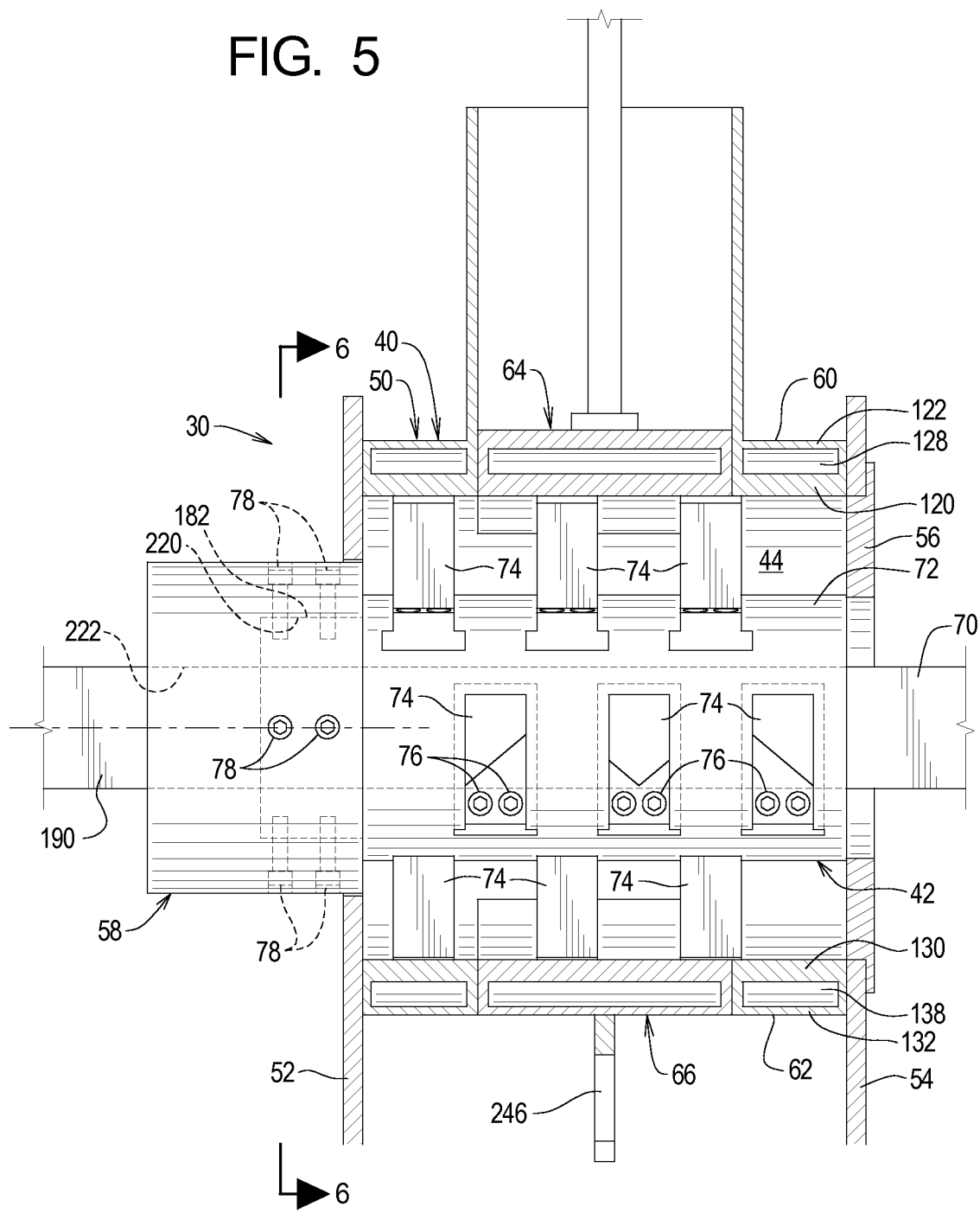
FIG. 5 is a side elevation, partial cut-away view of an example compounding system of the example recycling system of FIG. 1.
Figure 6:
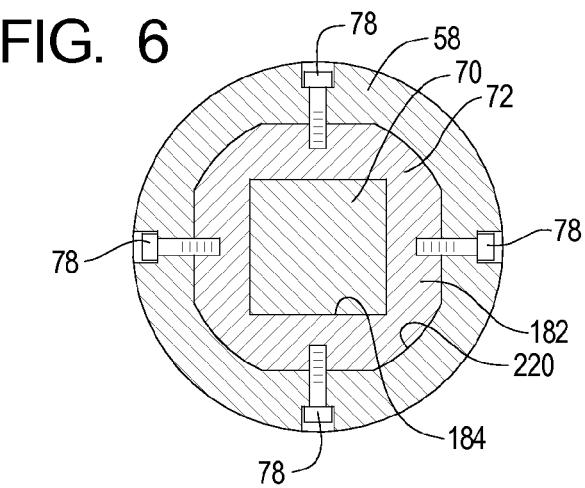
FIG. 6 is a section view taken along lines 6-6 in FIG. 5.

FIG. 12 illustrates that the locking hub 58 is generally cylindrical and defines a hub chamber 220 and a hub shaft opening 222. As shown in FIG. 5, a cross-sectional area of the hub chamber 220 substantially matches, but is slightly larger than, a cross-sectional area of the hub portion 182 of the example sleeve 72. A cross-section of the hub shaft opening 222 substantially matches, but is slightly larger than, the cross-sectional shape of the central portion 190 of the example shaft 70. The hub chamber is sized and dimensioned to receive the hub portion 182 of the sleeve 72, and the hub bolts 78 are used to attach the sleeve 72 to the locking hub 58 when the sleeve 72 is in the operating mode.

FIGS. 2 and 8-11 show that the example feed system 32 comprises a feed structure 230 and a feed ram 232. The feed structure 230 defines a first feed chamber 234, a second feed chamber 236, and a feed chute 238. A first feed actuator 240 is operatively connected to the feed door 64, and a second feed actuator 242 is operatively connected to the feed ram 232. The processing system 22 defines a dump pivot 244, and a dump arm 246 is pivotably supported by the dump pivot 244. The dump arm 246 is operatively connected to the dump door 66. A dump actuator 248 is connected to the dump arm 246.

The example feed system 32 operates as shown in FIGS. 8-11. Feed material is initially loaded into the second feed chamber 236 through the feed chute 238. The second feed actuator 242 displaces the feed ram 232 from a feed position to a drive position to force a predetermined quantity of feed material into the first feed chamber 234. The first feed actuator 240 is then operated to displace the feed door 64 from an open position to a closed position to force the predetermined quantity of feed material into the working chamber 44. The compounding system 30 is then operated for the required processing time. At the same time, the second feed actuator 242 may displace the feed ram 232 from the drive position to the feed position. After the required processing time, the dump door actuator 248 is operated to displace the dump door 66 from a closed position to an open position, which allows the processed material to be removed or fall out of the working chamber 44. At the same time, the first feed actuator 240 is operated to place the feed door from its closed position to the open position. The dump door actuator 248 then returns the dump door 66 to the closed position, and the feed process is repeated.

Referring now to FIGS. 3A-C, 4A-C, and 7A-D, the example arms 74 and arm cavities 186 will now be described in further detail. The example arms 74 are of several varieties as shown in FIGS. 7A-7D, but all of the varieties of arms 74 depicted in FIGS. 7A-D comprise a base plate 250, a working projection 252, first and second bolt openings 254 and 256, and at least one working surface 258.

Figure 7A:
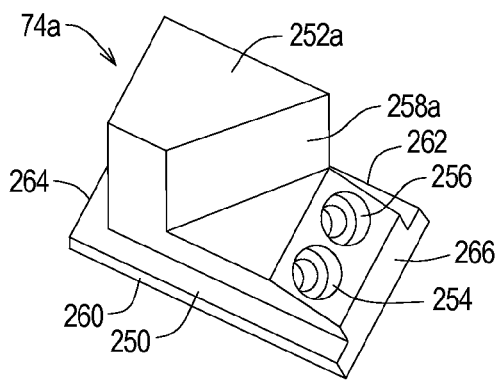
FIGS. 7A-D are perspective views of several example arms that may be used as part of the example recycling system of FIG. 1.
Figure 7B:
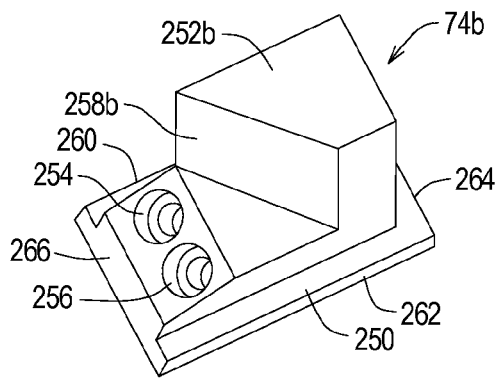
Figure 7C:
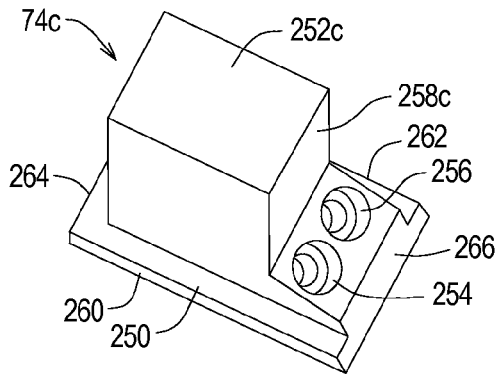
Figure 7D:
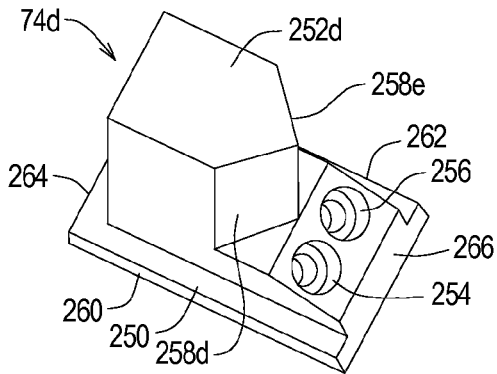
Figure 8:
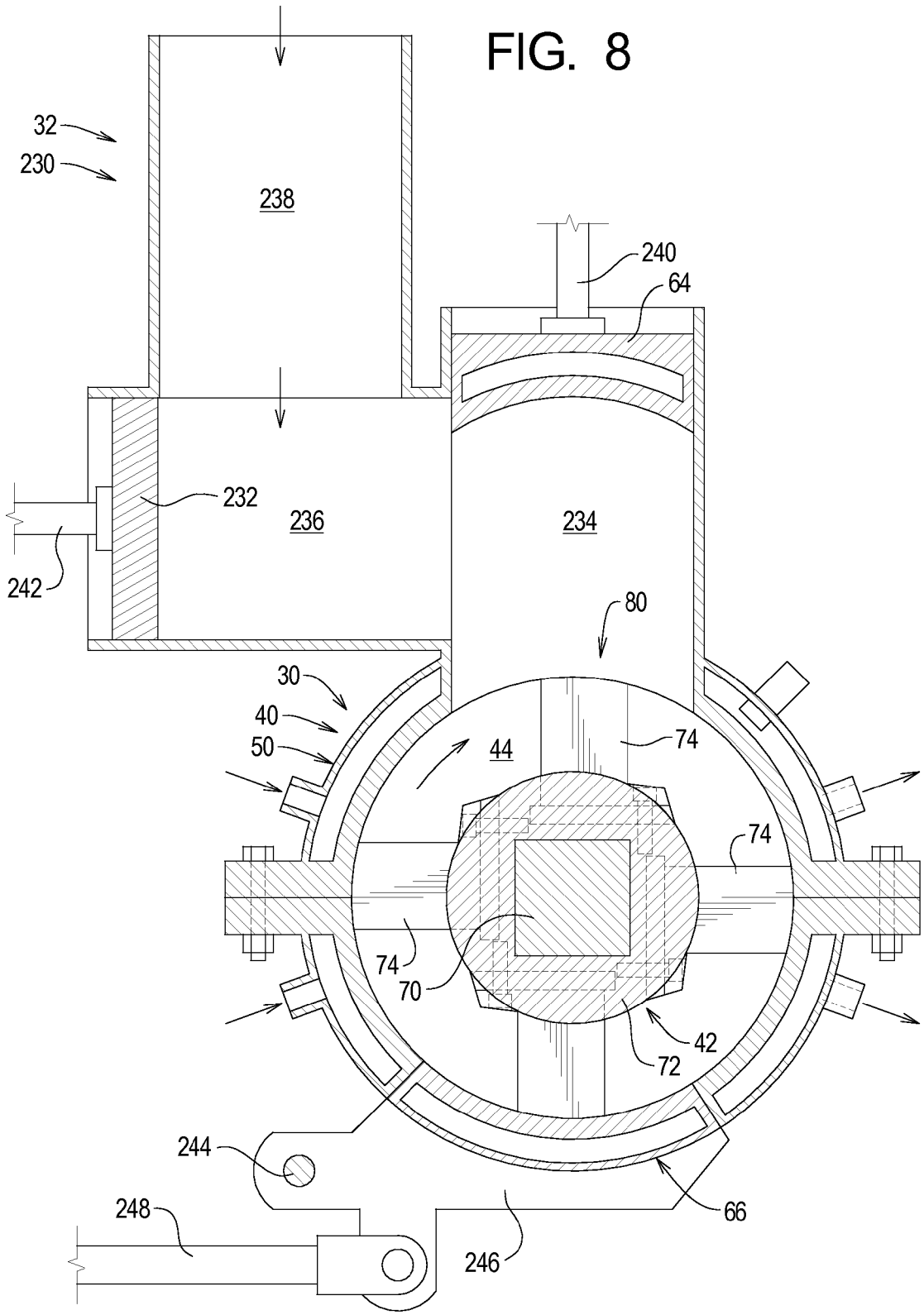
FIGS. 8-10 are section views similar to FIG. 2 illustrating the process of feeding feed material into the example compounder.
Figure 9:
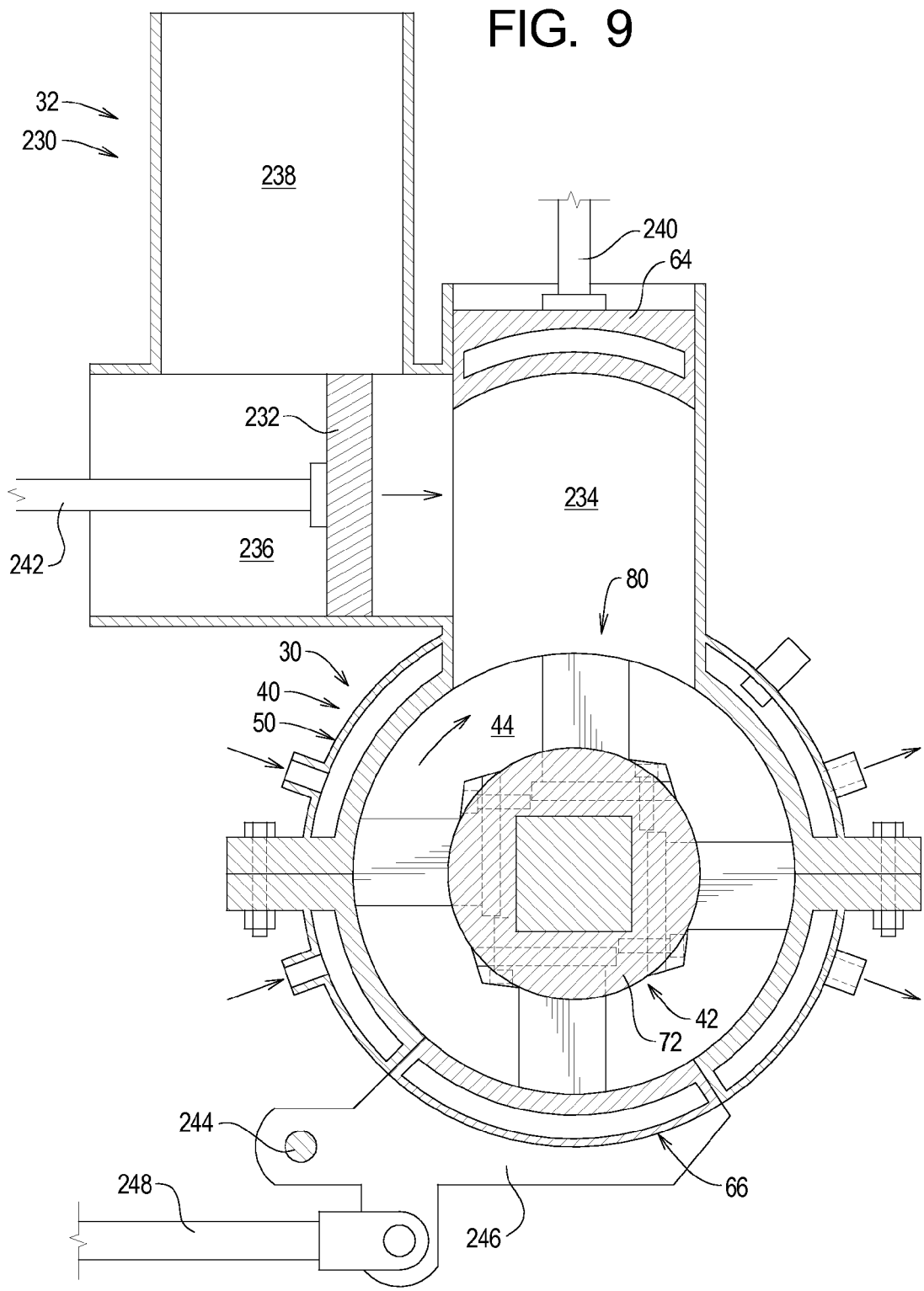
Figure 10:
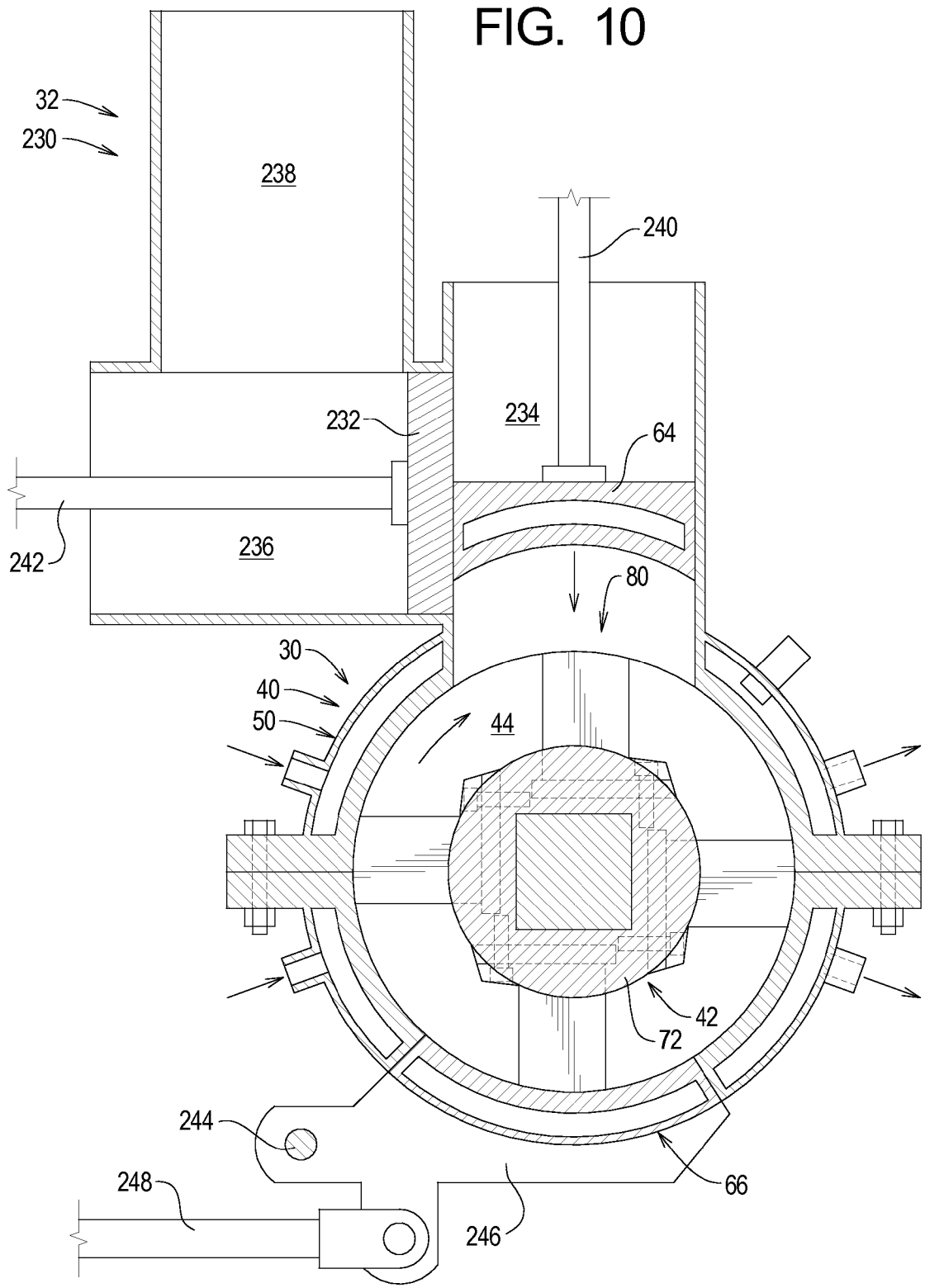
Figure 11:
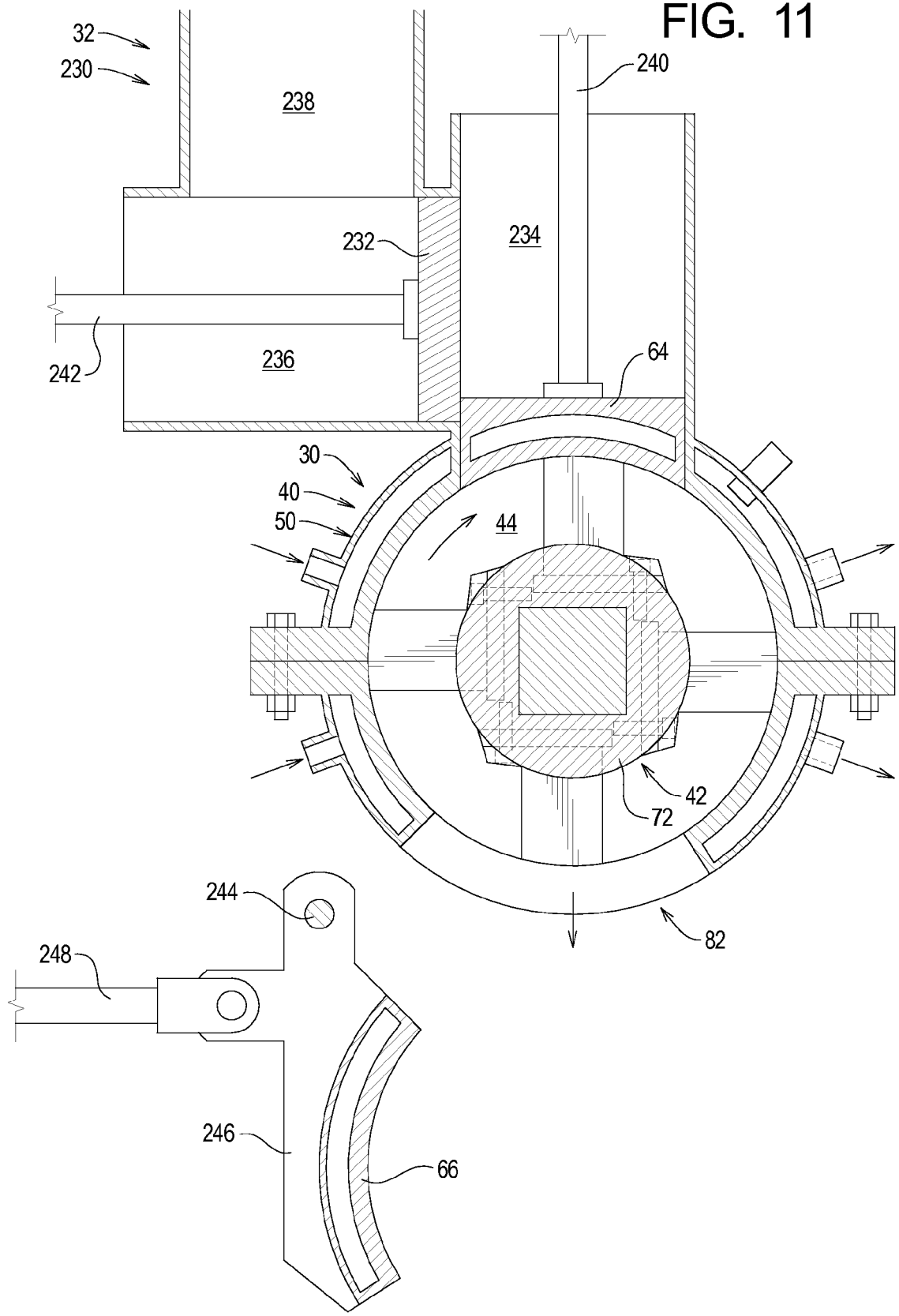
FIG. 11 is a section view similar to FIG. 2 illustrating the process of removing processed material from the example compounder.

The working surfaces 258 are arranged in different angular orientations depending on the function of the particular variety of arm 74. In FIG. 7A, a working surface 258a is angled to deflect material to the right relative to the direction of travel of the working surface 258a during normal use. In FIG. 7B, the working surface 258b is angled to deflect material to the left relative to the direction of travel of the working surface 258b during normal use. In FIG. 7C, the working surface 258c is not relative to the direction of travel of the working surface 258c during normal use. In FIG. 7D, the working surfaces 258d and 258e are angled to deflect material to the left and right relative to the direction of travel of the working surfaces 258d and 258e during normal use.

FIGS. 3B, 4B, and 7A-7D illustrate that the example base plate 250 of each of the varieties of the arms 74 comprises a first edge portion 260, a second edge portion 262, an inner edge portion 264, and a front edge portion 266. The example bolt openings 254 and 256 are formed in the front edge portion 266 of the base plate 250.

FIGS. 3C and 4C illustrate that the arm cavities 186 are defined by a plurality of surfaces formed in the main portion 180 of the sleeve 72. In particular, the example arm cavities 186 are formed by a main surface 270, first and second side edge surfaces 272 and 274, first and second opposing surfaces 276 and 278, an inner edge surface 280, an inner opposing surface 282, a first side surface 284, a second side surface 286, and an inner side surface 288. The main surface 270, first and second side edge surfaces 272 and 274, first and second opposing surfaces 276 and 278, inner edge surface 280, and inner opposing surface 282 define a base portion 290 of the arm cavities 186. The first side surface 284, second side surface 286, and inner side surface 288 form a restricted portion 292 of the arm cavities 186. A cross-sectional area of the base portion 290 in a direction perpendicular to the main surface 270 is greater than that of the restricted portion 292. FIGS. 3C and 4C further illustrate that first and second bolt cavities 294 and 296 are formed in the main surface 270 of each of the arm cavities 186.

To connect the arms 74 to the sleeve 72, the base plate 250 is set on the main surface 270 of a desired arm cavity 186 and then displaced until the inner edge portion 264 of the base plate 250 contacts the inner edge surface 280 and is arranged below the inner opposing surface 282 of the sleeve 72. At this point, most of the first and second edge portions 260 and 262 of the base plate 250 are below the first and second opposing surfaces 276 and 278. The opposing surfaces 276, 278, and 282 engage the edge portions 260, 262, and 264 to prevent radial movement of the arm 74 relative to the sleeve 72. The base plate 250 will further engage the inner edge surface 280 and the working projection 252 engages the inner side surface 288 to prevent movement of the arm 74 into the arm cavity 186. To prevent movement of the arm 74 out of the arm cavity 186, the arm bolts 76 are extended through the bolt openings 254 and 256 and into the bolt cavities 294 and 296. This process is reversed to remove the arms 74 from the sleeve 72.

The example drive system 28 comprises a motor 322, a motor drive structure 324 supported by a drive shaft of the motor 322, a shaft drive structure 326 supported by the shaft 70, and a transmission structure 328. The transmission structure 328 may take the form of a belt, in which case the drive structures 324 and 326 take the form of pulleys. The transmission structure 328 may alternatively take the form of a chain, in which case the drive structures 324 and 326 take the form of sprockets. As yet another alternative, the shaft 70 may be directly connected to the drive shaft of the motor 322.

Referring now to FIGS. 13-17 of the drawing, depicted therein is a processing system 420 of a second example recycling system constructed in accordance with, and embodying, the principles of the present invention. The second example recycling system is similar to the first example recycling system 20 described above and thus will be thus described herein primarily to the extent that the second example recycling system differs from the first example recycling system 20.

The second example recycling system comprises the processing system 420, first and second bearing systems like the bearing system 24 and 26 described above, and a drive system like a drive system 28 described above.

Figure 13:
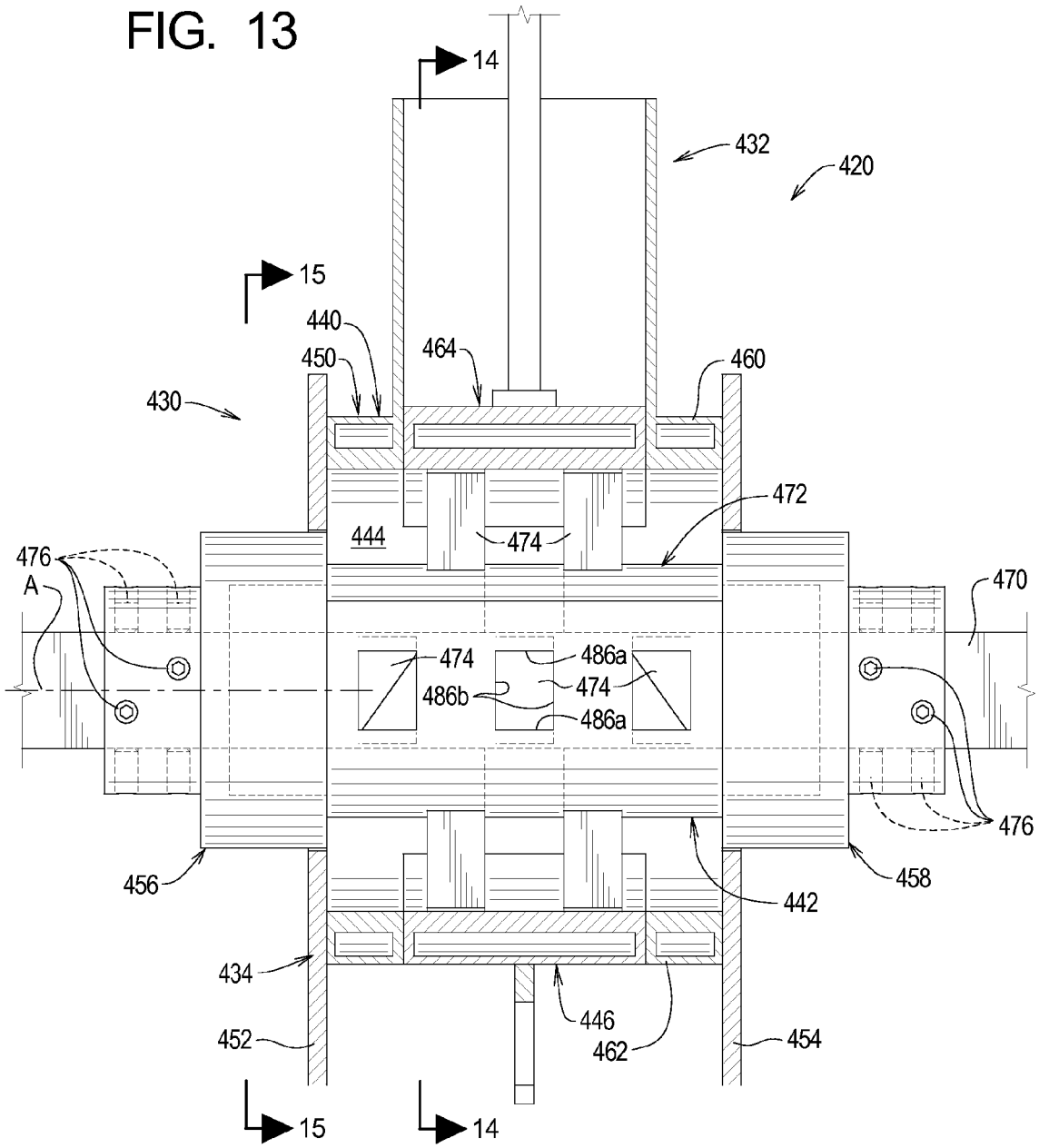
FIG. 13 is a side elevation, partial cut-away view of an example compounding system of a second example recycling system of the present invention.

As perhaps best shown in FIG. 13, the example processing system 420 comprises a compounding system 430, a feed system 432, and a cooling system 434. The feed system 432 and cooling system 434 are or may be similar to the feed system 32 and cooling system 34 described above and will not be described herein in detail.

The example compounding system 430 comprises a chamber assembly 440 and a compounding assembly 442. The example chamber assembly 440 defines a working chamber 444, and at least a portion of the compounding assembly 442 is arranged within the working chamber 444.

Figure 14:
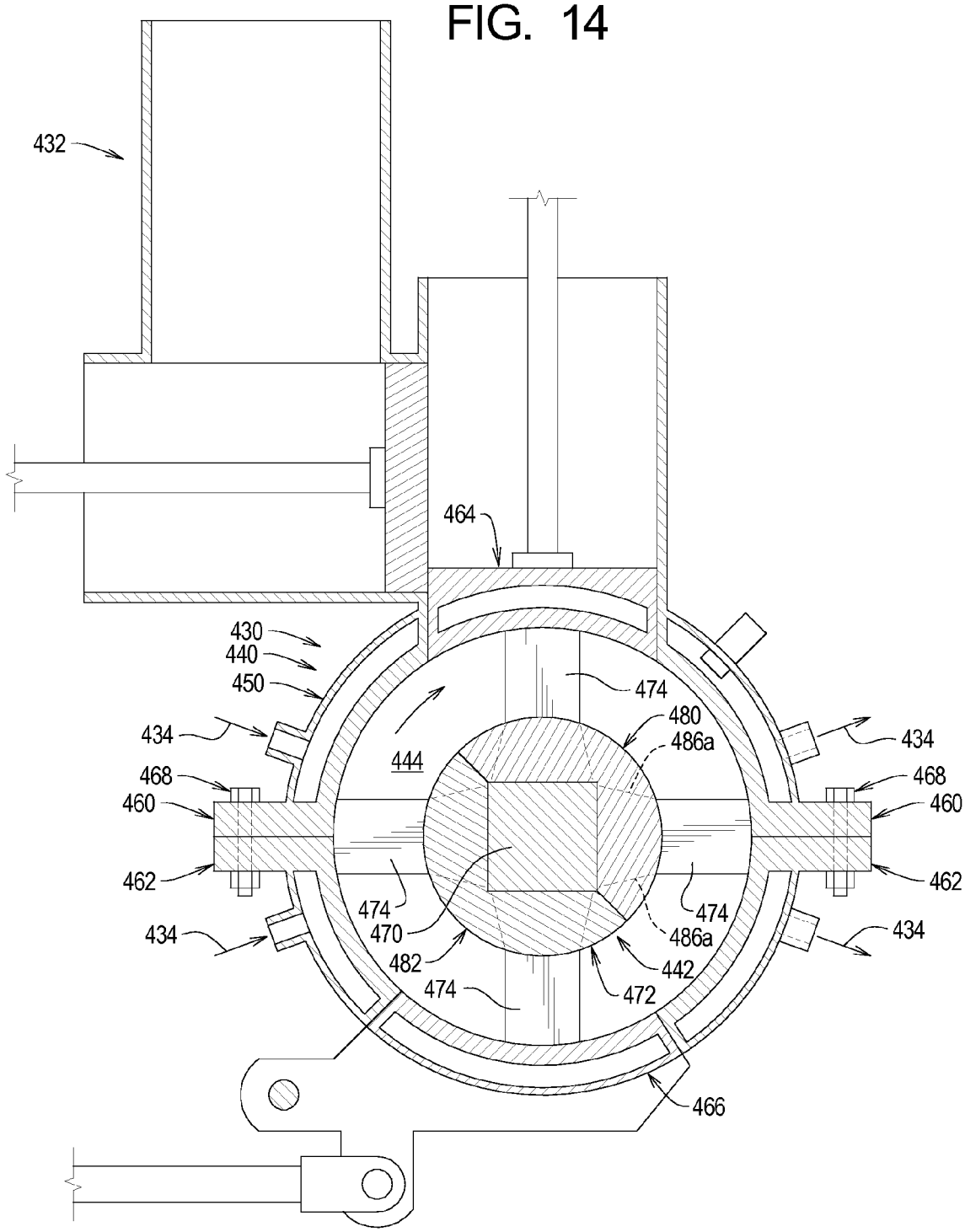
FIG. 14 is a section view taken along lines 14-14 in FIG. 13.

The example chamber assembly 440 comprises a housing assembly 450, a first end plate 452, a second end plate 454, a first hub 456, and a second hub 458. The housing assembly 450 comprises a housing upper structure 460, a housing lower structure 462, a feed door 464, a dump door 466, and a plurality of housing bolt assemblies 468 (FIG. 14). The housing bolt assemblies 468 join the housing upper structure 460 and the housing lower structure 462 together.

The example compounding assembly 442 comprises a shaft 470, a sleeve assembly 472, a plurality of arms 474, and a plurality of hub bolts 476. The arms 474 are supported by the sleeve assembly 472 such that the arms 474 radially extend from the sleeve assembly 472. The sleeve assembly 472 is supported by the shaft 470 for movement along the shaft 470 and such that axial rotation of the shaft 470 causes circular rotation of the arms 474 about a working path. The shaft 470 is supported for axial rotation by bearing systems such as the bearing systems 24 and 26 described above.

The sleeve assembly 472 is supported by the shaft 470 so that the hubs 456 and 458 fix the sleeve assembly 472 in an operating position as depicted in FIG. 13. The sleeve assembly 472 is within the working chamber 444 defined by the chamber assembly 440 when in the operating position. By disconnecting the sleeve assembly 472 from the hubs 456 and 458, the sleeve assembly 472 may be moved along the shaft 470 outside of the working chamber 444 and into a maintenance position along the shaft 470. In the maintenance position, the sleeve assembly 472 may be serviced with the sleeve assembly 472 in the maintenance position. The bearing systems support the shaft 470 for rotation about a shaft axis A and are spaced from each other to allow movement of the sleeve assembly 472 between the operating and maintenance positions.

Figure 15:
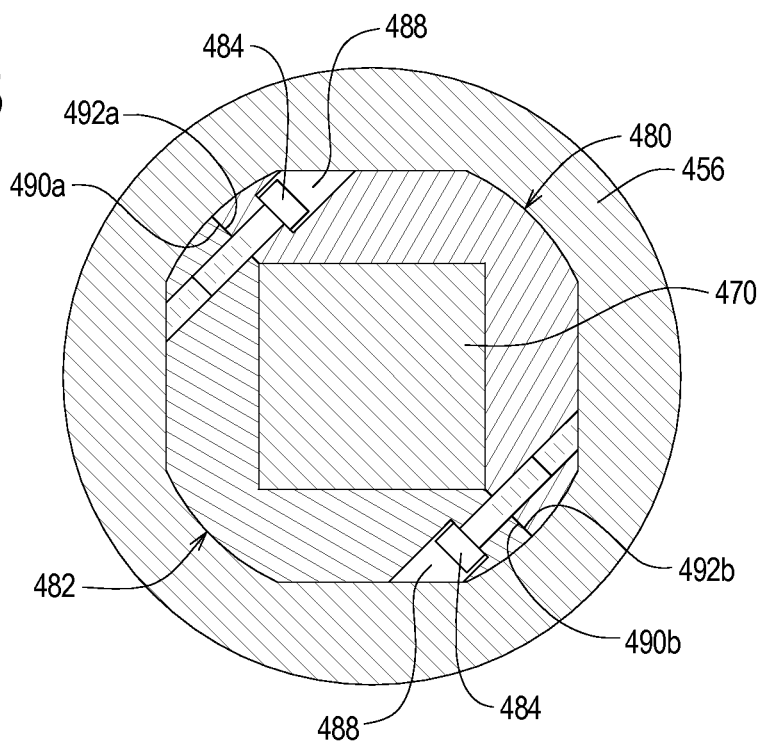
FIG. 15 is a section view taken along lines 15-15 in FIG. 13.
Figure 16:
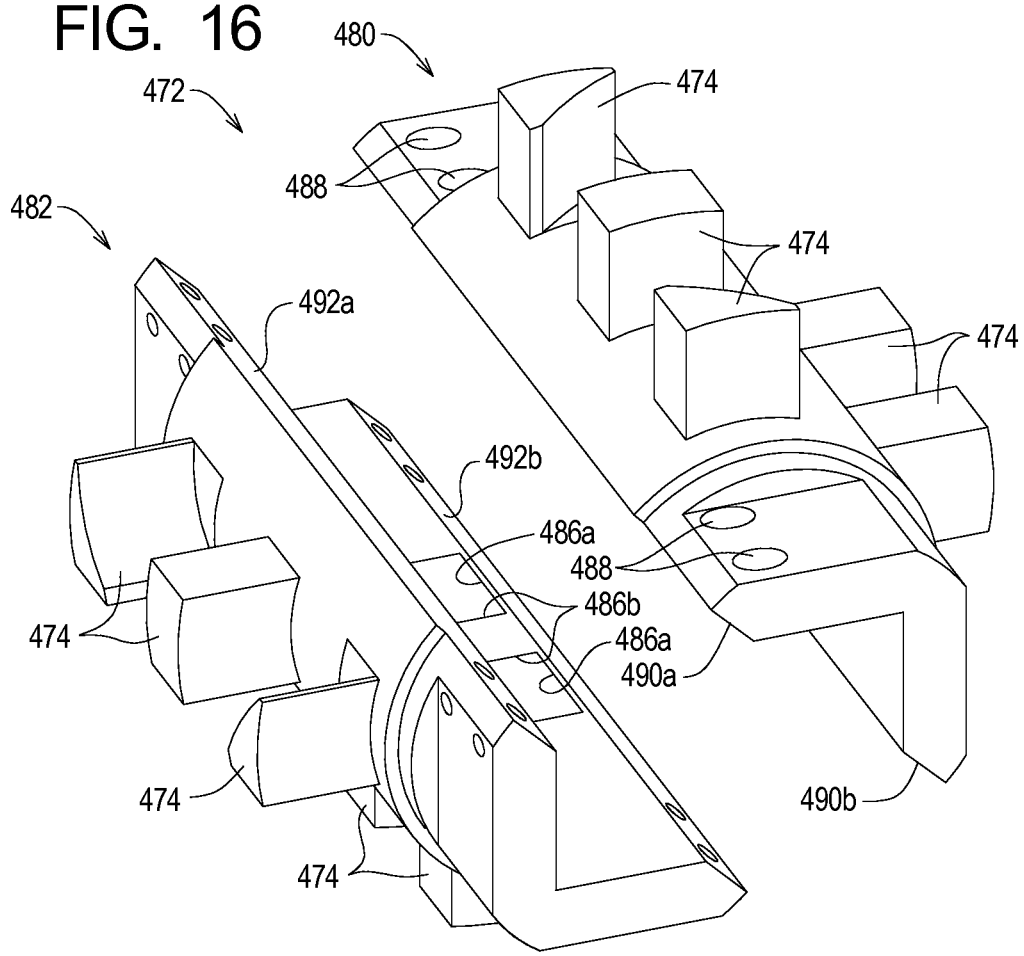
FIG. 16 is a perspective view of sleeve members forming a sleeve assembly of the compounding system depicted in FIG. 13.
Figure 17A:
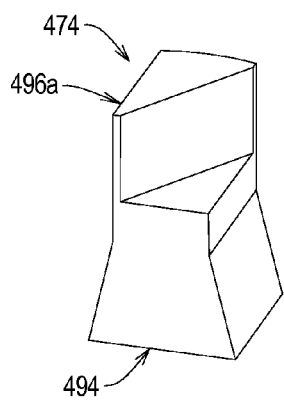
FIGS. 17A, 17B, and 17C are perspective views of arms that may be supported by the sleeve members of FIG. 16.
Figure 17B:
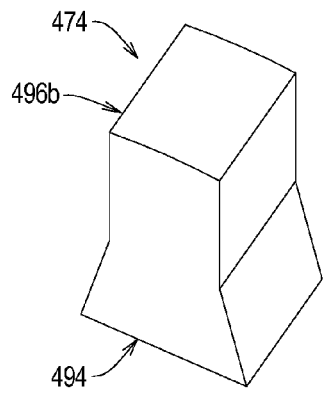
Figure 17C:
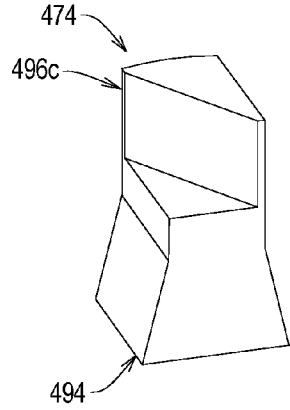

As perhaps best shown in FIGS. 14, 15, and 16, the example sleeve assembly 472 comprises a first sleeve member 480, a second sleeve member 482, and sleeve bolts 484. Each of the sleeve members 480 and 482 define one or more arm openings 486 each defining a proximal portion 486*a* and a distal portion 486*b*. A plurality of bolt sockets 488 are formed in at least one of the sleeve members 480 and 482. The sleeve bolts 484 threadingly engage at least one of the first and second sleeve members 480 and 482 to join the sleeve members 480 and 482 together to form the example sleeve assembly 472. With the sleeve bolts 484 so joining the first and second sleeve members 480 and 482 together, at least a portion of the sleeve bolts 484 lies within the bolt sockets 488.

The example sleeve member 480 defines first and second engagement surfaces 490*a* and 490*b*, and the example sleeve member 482 defines third and fourth engagement surfaces 492*a* and 492*b*. These engagement surfaces 490*a,b* and 492*a,b* are complementary such that, when the first and second sleeve members 480 and 482 are joined together, the first engagement surface 490*a* engages the third engagement surface 492*a* and the second engaging surface 490*b* engages the fourth engagement surface 492*b*. In this relationship, the example engaging surfaces 490*a,b* and 492*a,b* are all substantially coplanar. Other configurations of engaging surfaces may be employed in designing a sleeve assembly of the present invention.

The example arms 474 will now be described in further detail. The arms 474 may be designed such that they are identical. However, the example arms 474 are provided in more than one type, with three types of the arms 474 being shown in FIGS. 13, 16, and 17A, 17B, and 17C. Each of the arms 474 defines a base portion 494 and a head portion, with the head portions taking a first head portion configuration 496*a* in FIG. 17A, a second head portion configuration 496*b* in FIG. 17B, and a third head portion configuration 496*c* in FIG. 17C. The arms 474 each further define a base surface 498.

The base portion 494 of each of these arms 474 is configured to be received within the proximal portions 486*a* of the arm openings 486 and the head portions 496*a*, 496*b*, and 496*c* are configured to extend through the distal portions 486*b* of these arm openings 486. Further, the base portions 494 defined slanted or tapered surfaces that mate with similarly slanted or tapered surfaces on the proximal portions 486*a* of the arm openings 486. The base portions 494 thus engage the portion of sleeve member 480 or 482 surrounding proximal portion 486*a* of the arm openings 486 to allow the arms to extend the arm openings 486 only a desired amount or in a desired configuration with respect to the sleeve member 480 or 482.

When the arms 474 are extended in the desired configuration through the arm openings 486 of the sleeve members 480 or 482 as shown in FIG. 16, the sleeve members 480 and 482 are joined together using the sleeve bolts 484 around the shaft 470. In this configuration, the base surfaces 498 of the arms 474 engage the shaft 470 such that each of the arms 474 is held in its desired orientation during use of the compounding assembly 442. Further, centripetal force created when the shaft member 470 is rotated causes the base portions 494 of the arms 474 to be forced against the proximal portions 486*a* of the arm openings 486, further holding the arms 474 in the desired configuration or orientation during use of the compounding system 442.

With the example processing system 420 of the second example recycling system in an operating mode, the sleeve assembly 472 is fixed in the operating position and is thus located within the working chamber 444. The dump door 466 is initially opened, and the feed system 432 arranges feed material containing plastic waste within the working chamber 444. The feed door 464 is closed after the feed material has been arranged in the working chamber 444. The drive system (not shown) is operatively connected to the shaft 470 such that operation of the drive system causes axial rotation of the shaft 470 about the shaft axis A. Axial rotation of the shaft 470 causes rotation of the arms 474 along a circular path within the working chamber 444. The arms 474 act on the feed material to grind, blend, mix, heat, and/or otherwise process the feed material to obtain, after a processing period, processed material. After the processing period, the processed material is dough-like and warm and can be further molded into a plastic part. The cooling system 434 may be used as necessary to remove heat from the housing assembly 450 and thus reduce an operating temperature of the compounding system 430 as necessary.

To place the recycling system 420 in a maintenance mode, the sleeve assembly 472 is detached from the shaft 470 and moved from operating position to the maintenance position. With the sleeve assembly 472 in the maintenance position, the arms 474 may easily be repaired or removed and replaced. In addition, the working chamber 444 may easily be accessed for cleaning, maintenance, and repair with the sleeve assembly 472 in the maintenance position. The feed and dump doors 464 and 466 may further be opened to facilitate access to the working chamber.

From the foregoing, it should be clear that the present invention may be embodied in forms other than those described above. The above-described systems are therefore to be considered in all respects illustrative and not restrictive, the scope of the invention being indicated by the appended claims rather than the foregoing description. All changes that come within the meaning and scope of the claims are intended to be embraced therein.

What is claimed is:

1. A compounding system for feed material containing plastic waste, the compounding system comprising:
   a chamber assembly defining a working chamber;
   a shaft;
   a sleeve assembly comprising first and second sleeve members each defining at least one arm opening, where the first and second sleeve members are arranged in
      a first configuration in which the first and second sleeve members are detached from each other, and
      a second configuration in which the first and second sleeve members are secured together around the shaft to support the sleeve assembly on the shaft;
   a plurality of arms, where each of the arms is configured to be
      inserted partly through one of the arm openings when the sleeve assembly is in the first configuration, and
      held in a desired configuration relative to one of the first and second sleeve members when the sleeve assembly is in the second configuration; whereby
   feed material is processed by rotating the sleeve assembly such that the arms engage the feed material.

2. A compounding system as recited in claim 1, in which the sleeve assembly is
   supported on the shaft for movement between an operating position and a maintenance position;
   located within the chamber assembly when the shaft supports the sleeve in the operating position, and
   located outside of the chamber assembly when the shaft supports the sleeve in the maintenance position.

3. A compounding system as recited in claim 1, in which:
   feed material is processed by rotating the sleeve assembly in the operating position; and
   the sleeve assembly and arms may be accessed with the sleeve assembly in the maintenance position.

4. A compounding system as recited in claim 1, in which:
   the arms define a base portion and a working portion;
   the arm openings each comprising a proximal portion and a distal portion;
   the proximal portions receive the base portions of the arms; and
   the working portions of the arms extend through the distal portions of the arm openings.

5. A compounding system as recited in claim 4, in which a cross-sectional area of at least a portion of the base portion is greater than a cross-sectional area of the working portion.

6. A recycling system for feed material containing plastic waste, the recycling system comprising:
   a chamber assembly defining a working chamber;
   a shaft;
   first and second bearing systems for supporting the shaft for axial rotation;
   a sleeve assembly comprising first and second sleeve members each defining at least one arm opening, where the first and second sleeve members are arranged in
      a first configuration in which the first and second sleeve members are detached from each other, and
      a second configuration in which the first and second sleeve members are secured together around the shaft to support the sleeve assembly on the shaft;
   a plurality of arms, where each of the arms is configured to be
      inserted partly through one of the arm openings when the sleeve assembly is in the first configuration, and
      held in a desired configuration relative to one of the first and second sleeve members when the sleeve assembly is in the second configuration; whereby
   feed material is processed by rotating the sleeve assembly such that the arms engage the feed material.

7. A recycling system as recited in claim 6, in which the sleeve assembly is
   supported on the shaft for movement between an operating position and a maintenance position;
   located within the chamber assembly when the shaft supports the sleeve in the operating position, and
   located outside of the chamber assembly when the shaft supports the sleeve in the maintenance position.

8. A recycling system as recited in claim 6, in which:
   feed material is processed by rotating the sleeve assembly in the operating position; and
   the sleeve assembly and arms may be accessed with the sleeve assembly in the maintenance position.

9. A recycling system as recited in claim 6, in which:
   the arms define a base portion and a working portion;
   the arm openings each comprising a proximal portion and a distal portion;
   the proximal portions receive the base portions of the arms; and
   the working portions of the arms extend through the distal portions of the arm openings.

10. A recycling system as recited in claim 9, in which a cross-sectional area of at least a portion of the base portion is greater than a cross-sectional area of the working portion.

* * * * *